(12) United States Patent
Fu

(10) Patent No.: US 11,330,321 B2
(45) Date of Patent: May 10, 2022

(54) METHOD AND DEVICE FOR ADJUSTING VIDEO PARAMETER BASED ON VOICEPRINT RECOGNITION AND READABLE STORAGE MEDIUM

(71) Applicant: SHENZHEN SKYWORTH-RGB ELECTRONIC CO., LTD., Shenzhen (CN)

(72) Inventor: Huadong Fu, Shenzhen (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 17/041,967

(22) PCT Filed: Mar. 28, 2019

(86) PCT No.: PCT/CN2019/079996
§ 371 (c)(1),
(2) Date: Sep. 25, 2020

(87) PCT Pub. No.: WO2020/124845
PCT Pub. Date: Jun. 25, 2020

(65) Prior Publication Data
US 2021/0136441 A1 May 6, 2021

(30) Foreign Application Priority Data
Dec. 21, 2018 (CN) .......................... 201811586465.4

(51) Int. Cl.
*H04N 21/422* (2011.01)
*G10L 17/22* (2013.01)
(Continued)

(52) U.S. Cl.
CPC ....... *H04N 21/42203* (2013.01); *G10L 17/22* (2013.01); *H04N 21/4415* (2013.01); *H04N 21/44218* (2013.01)

(58) Field of Classification Search
None
See application file for complete search history.

(56) References Cited

U.S. PATENT DOCUMENTS

2003/0063222 A1* 4/2003 Creed .................... H04N 7/163
348/687
2008/0111830 A1* 5/2008 Liu ........................ G06F 1/3218
345/619
(Continued)

FOREIGN PATENT DOCUMENTS

CN 103126690 A 6/2013
CN 105959768 A 9/2016
(Continued)

OTHER PUBLICATIONS

International Search Report and Written Opinion in corresponding PCT Application No. PCT/CN2019/079996, dated Sep. 5, 2019.
(Continued)

*Primary Examiner* — Alexander Q Huerta
(74) *Attorney, Agent, or Firm* — Westbridge IP LLC

(57) ABSTRACT

Disclosed are a method for adjusting a video parameter based on voiceprint recognition, a device for adjusting a video parameter based on voiceprint recognition and a readable storage medium, where the method includes: during a video program is displayed on a smart terminal, receiving audio information collected by a voiceprint data collection module; in a determination that a voiceprint feature library includes target preset audio information corresponding to the audio information, determining user identity information and user mood information corresponding to the audio information based on the target preset audio (Continued)

information; acquiring an adjustment parameter of a parameter adjustment mode corresponding to the user mood information, and acquiring an adjustment ratio corresponding to the parameter adjustment mode based on the user identity information; and adjusting a video playback parameter of the smart terminal based on the adjustment parameter and the adjustment ratio.

11 Claims, 1 Drawing Sheet

(51) Int. Cl.
*H04N 21/4415* (2011.01)
*H04N 21/442* (2011.01)

(56) References Cited

U.S. PATENT DOCUMENTS

| | | | | |
|---|---|---|---|---|
| 2010/0013855 | A1* | 1/2010 | Allen | G09G 5/00 |
| | | | | 345/619 |
| 2010/0097523 | A1 | 4/2010 | Shin | |
| 2011/0069940 | A1* | 3/2011 | Shimy | H04N 5/44543 |
| | | | | 386/296 |
| 2011/0095875 | A1* | 4/2011 | Thyssen | G09G 5/10 |
| | | | | 340/407.1 |
| 2011/0176786 | A1* | 7/2011 | Cooper | H04N 21/4126 |
| | | | | 386/230 |
| 2012/0124456 | A1* | 5/2012 | Perez | G06Q 30/06 |
| | | | | 715/200 |
| 2012/0304223 | A1 | 11/2012 | Sargent et al. | |
| 2015/0346987 | A1* | 12/2015 | Ren | G09G 3/3406 |
| | | | | 345/589 |
| 2016/0342389 | A1* | 11/2016 | Weinstein | G06F 40/109 |
| 2016/0373197 | A1* | 12/2016 | Brenner | H04N 21/654 |
| 2017/0223092 | A1* | 8/2017 | Subramanian | G06Q 30/02 |
| 2018/0288115 | A1 | 10/2018 | Asnis et al. | |

FOREIGN PATENT DOCUMENTS

| | | |
|---|---|---|
| CN | 106250400 A | 12/2016 |
| CN | 107085512 A | 8/2017 |
| CN | 107197404 A | 9/2017 |
| CN | 107203953 A | 9/2017 |
| CN | 107360507 A | 11/2017 |
| CN | 107516533 A | 12/2017 |
| CN | 107886950 A | 4/2018 |
| CN | 107959881 A | 4/2018 |
| CN | 107977187 A | 5/2018 |
| CN | 108877357 A | 11/2018 |
| CN | 108919953 A | 11/2018 |
| CN | 109448735 A | 3/2019 |

OTHER PUBLICATIONS

Examination Report in counterpart Indian Patent Application No. 202017046156, dated Dec. 6, 2021.
First Office Action in counterpart Chinese Patent Application No. 201811586465.4, dated Nov. 3, 2021.
Supplementary European Search Report in counterpart European Patent Application No. 19899048.3, dated Feb. 8, 2022.

* cited by examiner

METHOD AND DEVICE FOR ADJUSTING VIDEO PARAMETER BASED ON VOICEPRINT RECOGNITION AND READABLE STORAGE MEDIUM

FIELD

This application relates to the field of data processing technology, and in particular to a method and a device for adjusting a video parameter based on voiceprint recognition and a readable storage medium.

BACKGROUND

With the rapid development of smart technology, smart terminals such as smart TVs have entered millions of households. Since each user's preferences are different, and each user may have a different mood at different times, and different moods correspond to different preferences, so people's personalized needs for smart terminals are becoming stronger and stronger.

Currently, the adjustment of playback parameters such as the image mode and sound mode of the smart terminal is mostly manually adjusted by the user. When the user is in a happy mood, the user may adjust the screen of the smart terminal to be brighter and the sound to be louder; when the user is in a low mood, the user may adjust the screen of the smart terminal to be darker and the sound to be smaller. Moreover, users of different ages, such as the elderly, adults, and children, have different requirements for playback parameters such as image mode and sound mode under the same mood.

However, when the user's mood is different, the playback parameters of the smart terminal can only be manually adjusted by the user, and cannot be automatically adjusted according to the user's identity and mood, resulting in the playback parameter adjustment process being not smart enough, lacking humanity, and affecting the user experience.

The above content is only used to help understand the technical solution of this application, and does not mean that the above content is recognized as prior art.

SUMMARY

The main purpose of this application is to provide a method and a device for adjusting a video parameter based on voiceprint recognition and a readable storage medium, aiming to solve the technical problem that the play back parameters of the smart terminal cannot be automatically adjusted according to the user's identity and mood.

In order to achieve the above purpose, this application provides a method for adjusting a video parameter based on voiceprint recognition, including the following operations:

during a video program is displayed on a smart terminal, receiving audio information collected by a voiceprint data collection module;

in a determination that a voiceprint feature library includes target preset audio information corresponding to the audio information, determining user identity information and user mood information corresponding to the audio information based on the target preset audio information;

acquiring an adjustment parameter of a parameter adjustment mode corresponding to the user mood information, and acquiring an adjustment ratio corresponding to the parameter adjustment mode based on the user identity information; and adjusting a video playback parameter of the smart terminal based on the adjustment parameter and the adjustment ratio.

In addition, in order to achieve the above purpose, this application further provides a device for adjusting a video parameter based on voiceprint recognition, including: a memory, a processor, and a computer readable instruction stored on the memory and executable on the processor, the computer readable instruction, when executed by the processor, implements the operations of the aforementioned method for adjusting the video parameter based on voiceprint recognition.

In addition, in order to achieve the above purpose, this application further provides a readable storage medium, a computer readable instruction is stored on the readable storage medium, the computer readable instruction, when executed by the processor, implements the operations of the aforementioned method for adjusting the video parameter based on voiceprint recognition.

In this application, during a video program is displayed on a smart terminal, receiving audio information collected by a voiceprint data collection module; in a determination that a voiceprint feature library includes target preset audio information corresponding to the audio information, determining user identity information and user mood information corresponding to the audio information based on the target preset audio information; acquiring an adjustment parameter of a parameter adjustment mode corresponding to the user mood information, and acquiring an adjustment ratio corresponding to the parameter adjustment mode based on the user identity information; and adjusting a video playback parameter of the smart terminal based on the adjustment parameter and the adjustment ratio. In this way, the video playback parameter of the smart terminal may be automatically adjusted according to the user identity information and the user mood information corresponding to the audio information, so as to realize the intelligent adjustment of the video playback parameter of the smart terminal and improve the user experience.

The realization, functional characteristics, and advantages of the purpose of this application will be further described in conjunction with the embodiments and with reference to the accompanying drawings.

DETAILED DESCRIPTION OF THE EMBODIMENTS

It should be understood that the specific embodiments described herein are only used to explain this application, and are not used to limit this application.

Figure 1:
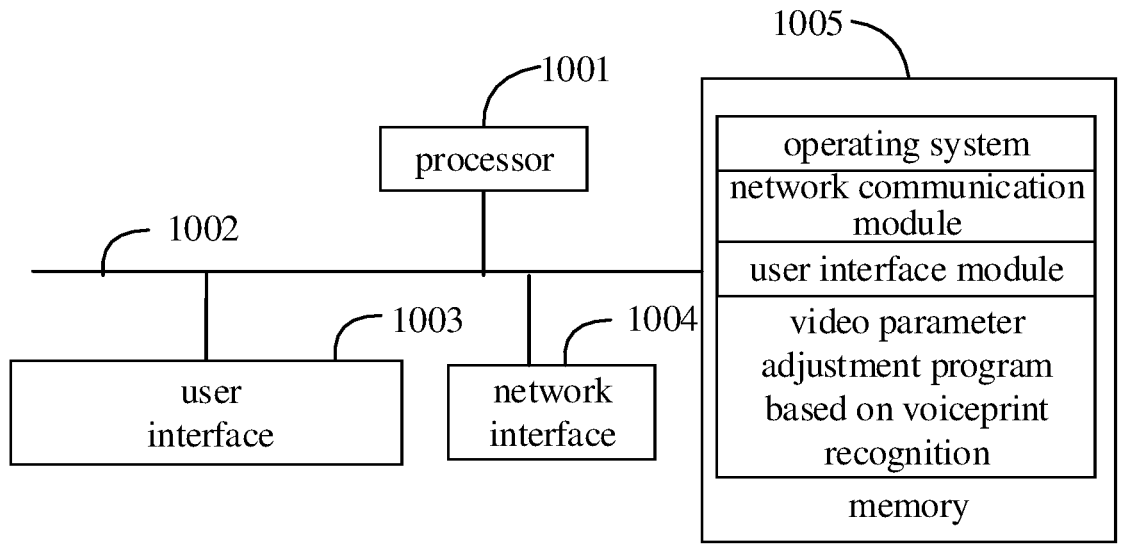
FIG. 1 is a schematic structural diagram of a device for adjusting a video parameter based on voiceprint recognition in a hardware operating environment according to an embodiment of this application.

As shown in FIG. 1, FIG. 1 is a schematic structural diagram of a device for adjusting a video parameter based on voiceprint recognition in a hardware operating environment according to an embodiment of this application.

The device for adjusting the video parameter based on voiceprint recognition in some embodiments of this application may be a smart TV, a PC, a smart phone, a tablet computer, an e-book reader, a Moving Picture Experts Group Audio Layer III (MP3) player, a Moving Picture Experts Group Audio Layer IV (MP4) player, a portable computer and other portable terminal devices with display functions.

As shown in FIG. 1, the device for adjusting the video parameter based on voiceprint recognition may include a processor 1001, such as a CPU, a network interface 1004, a user interface 1003, a memory 1005, and a communication bus 1002. The communication bus 1002 is configured to implement connection communication between these components. The user interface 1003 may include a display, an input unit such as a keyboard, and optionally the user interface 1003 may further include a standard wired interface and a wireless interface. The network interface 1004 may optionally include a standard wired interface and a wireless interface (such as a WI-FI interface). The memory 1005 may be a high-speed RAM memory or a stable memory (non-volatile memory), such as a disk memory. Optionally, the memory 1005 may be a storage device independent of the foregoing processor 1001.

Optionally, the device for adjusting the video parameter based on voiceprint recognition may further include a camera, an RF (Radio Frequency) circuit, a sensor, an audio circuit, a WiFi module, and so on. Sensors may be light sensors, motion sensors and other sensors. Specifically, the light sensor may include an ambient light sensor and a proximity sensor, where the ambient light sensor may adjust the brightness of the display screen according to the brightness of the ambient light. Certainly, the device for adjusting the video parameter based on voiceprint recognition may further be equipped with other sensors such as a gyroscope, a barometer, a hygrometer, a thermometer, an infrared sensor, which will not be repeated here.

Those skilled in the art can understand that the structure of the device for adjusting the video parameter based on voiceprint recognition shown in FIG. 1 does not constitute a limitation on the device for adjusting the video parameter based on voiceprint recognition, and more or less components than those illustrated may be included, or certain components may be combined, or different components may be arranged.

As shown in FIG. 1, the memory 1005 as a computer storage medium may include an operating system, a network communication module, a user interface module, and an computer readable instruction.

In the device for adjusting the video parameter based on voiceprint recognition shown in FIG. 1, the network interface 1004 is mainly configured to connect to the back-end server and perform data communication with the back-end server; the user interface 1003 is mainly configured to connect to the client (user end) and perform data communication with the client; and the processor 1001 may be configured to call the computer readable instruction stored in the memory 1005.

In this embodiment, the device for adjusting the video parameter based on voiceprint recognition includes: a memory 1005, a processor 1001, and a computer readable instruction stored on the memory 1005 and executable on the processor 1001, where the processor 1001 calls the computer readable instruction stored in the memory 1005 to implement the operations in the various embodiments of the method for adjusting the video parameter based on voiceprint recognition.

Figure 2:
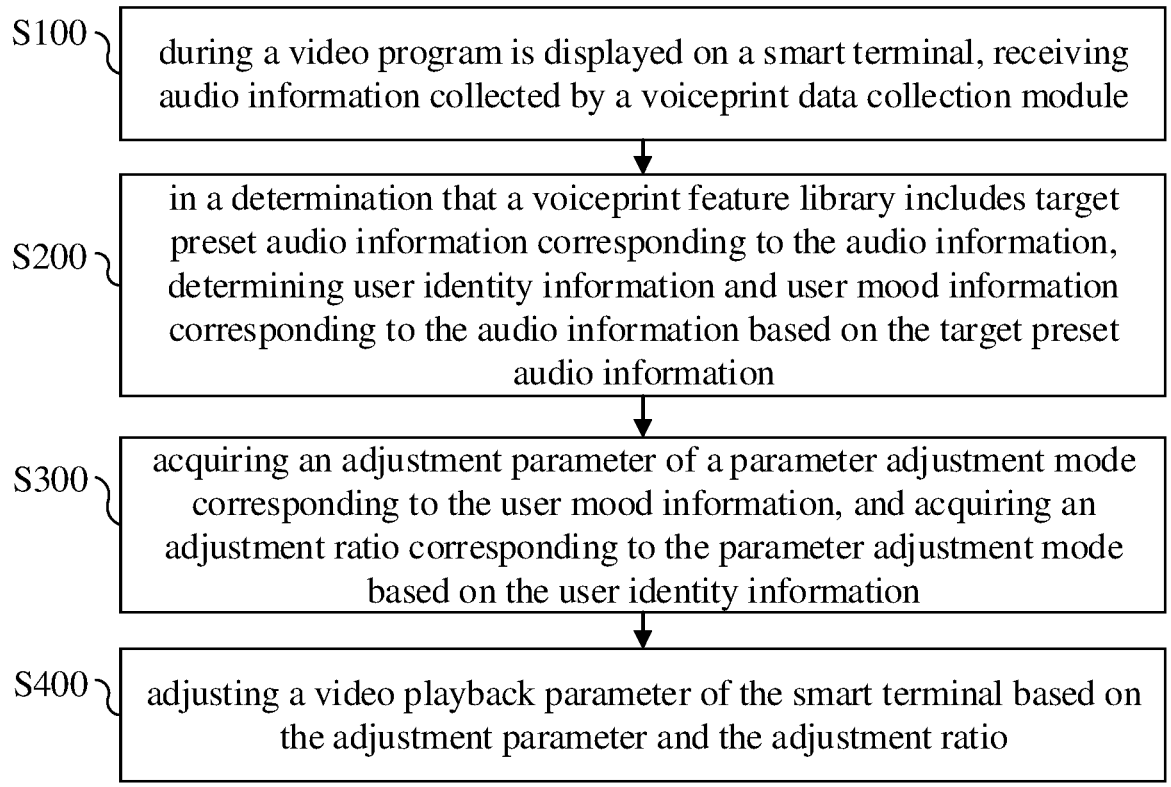
FIG. 2 is a schematic flowchart of a method for adjusting a video parameter based on voiceprint recognition according to a first embodiment of this application.

This application further provides a method for adjusting a video parameter based on voiceprint recognition. Referring to FIG. 2, FIG. 2 is a schematic flowchart of a method for adjusting a video parameter based on voiceprint recognition according to a first embodiment of this application.

The method for adjusting the video parameter based on voiceprint recognition includes:

Step S100, during a video program is displayed on a smart terminal, receiving audio information collected by a voiceprint data collection module.

In this embodiment, the voiceprint data collection module may be set in the smart terminal, or the voiceprint data collection module may be a separate sound collection device such as a microphone, that is, the voiceprint data collection module may collect audio information based on far-field speech, so that the audio information only includes the user's voice information.

When the smart terminal plays a video program, when the voiceprint data collection module collects audio information, the audio information collected within a preset time period is sent to the smart terminal, and the smart terminal receives the audio information collected by the voiceprint data collection module. If the voiceprint data collection module is set in the smart terminal, the audio information collected by the voiceprint data collection module is mixed with the audio signal output by the smart terminal. At this time, based on the audio signal output by the smart terminal corresponding to the preset duration, the received audio information is filter and it is determined whether there is target preset audio information corresponding to the audio information.

Step S200, in a determination that a voiceprint feature library includes target preset audio information corresponding to the audio information, determining user identity information and user mood information corresponding to the audio information based on the target preset audio information.

In this embodiment, when the audio information is received, it is determined whether there is target preset audio information corresponding to the audio information, that is, it is determined whether there is preset audio information that matches the audio information. When the voiceprint feature library includes the target preset audio information corresponding to the audio information, based on the target preset audio information, determining the user identity information and the user mood information corresponding to the audio information. The user identity information includes the user's age and gender information corresponding to the audio information.

Specifically, the smart terminal is provided with a voiceprint feature library. The voiceprint feature library stores preset audio information of various moods corresponding to each member of the family to which the smart terminal belongs. The voiceprint feature library stores the preset audio information, as well as the user identity information and the user mood information corresponding to the preset audio information. When the audio information is acquired, it may be determined whether the voiceprint feature library includes the preset audio information that matches the audio information, that is, the target preset audio information. If yes, the user identity information and the user mood information corresponding to the target preset audio information are the user identity information and user mood information corresponding to the audio information.

Step S300, acquiring an adjustment parameter of a parameter adjustment mode corresponding to the user mood information, and acquiring an adjustment ratio corresponding to the parameter adjustment mode based on the user identity information.

In this embodiment, the smart terminal stores various parameter adjustment modes corresponding to the user mood information. The parameter adjustment mode includes adjustment parameters of video playback parameters. For different users, the smart terminal further stores adjustment ratios corresponding to various user identity information. When determining the user identity information and the user mood information, the adjustment parameter of the parameter adjustment mode corresponding to the user mood information is acquired, and the adjustment ratio is acquired according to the user identity information.

The parameter adjustment mode includes an enhanced mode, an intermediate mode and a weakened mode.

Where, the enhanced mode includes an image enhanced mode and a sound enhanced mode. The adjustment parameters of the enhanced mode include adjustment parameters of the image enhanced mode and adjustment parameters of the sound enhanced mode. The adjustment parameters of the image enhanced mode include increasing contrast and brightness according to a first ratio, adjusting hue to warm, increasing saturation according to a second ratio, or increasing sharpness according to a third ratio. The adjustment parameters of the sound enhanced mode include increasing volume according to a fourth ratio, increasing heavy bass according to a fifth ratio, and raising pitch and bass or turning on surround sound according to a sixth ratio.

The intermediate mode includes an image intermediate mode and a sound intermediate mode. The adjustment parameters of the intermediate mode include adjustment parameters of the image intermediate mode and adjustment parameters of the sound intermediate mode. The adjustment parameters of the image intermediate mode include respectively adjusting contrast to preset intermediate contrast and brightness to preset intermediate brightness, adjusting hue to normal hue, adjusting saturation to normal color saturation, or adjusting sharpness to preset intermediate sharpness. The adjustment parameters of sound intermediate mode include adjusting volume to preset intermediate volume, adjusting heavy bass to preset intermediate heavy bass, adjusting treble and bass to preset intermediate treble and bass, or turning on surround sound.

The weakened mode includes an image weakened mode and a sound weakened mode. The adjustment parameters of the weakened mode include adjustment parameters of the image weakened mode and adjustment parameters of the sound weakened mode. The adjustment parameters of the image weakened mode include reducing contrast and brightness according to a seventh ratio, adjusting hue to cold, reducing saturation according to an eighth ratio, or reducing sharpness according to a ninth ratio. The adjustment parameters of the sound weakened mode include reducing volume according to a tenth ratio, reducing heavy bass according to an eleventh ratio, and lowering pitch and bass or turning off surround sound according to a twelfth ratio.

Where, the above-mentioned first ratio to the twelfth ratio may be set reasonably, and of course they may be the same.

The user identity information includes adults, children, and the elderly. Since the hearing and vision of the elderly are weaker than that of adults, and the hearing and vision of children are stronger than that of adults, different adjustment ratios are set for different user identity information.

S400, adjusting a video playback parameter of the smart terminal based on the adjustment parameter and the adjustment ratio.

In this embodiment, when the adjustment parameter and the adjustment ratio are acquired, the video playback parameter of the smart TV is adjusted based on the adjustment parameter and the adjustment ratio.

Specifically, if the parameter adjustment mode is the enhanced mode and the user identity information is for adults, the adjustment ratio is 100%, and then the video playback parameters are adjusted directly according to the adjustment parameters. If the user identity information is for children, the adjustment ratio may be 80%. If the user identity information is for the elderly, the adjustment ratio may be 120%, for example, the parameter such as the contrast and brightness is increased according to the first ratio (20%). If the user identity information is for adults, then the contrast and brightness of the smart terminal is increased by 20%. If the user identity information is for children, the contrast and brightness of the smart terminal is increased by 16% (20%*80%*100%). If the user identity information is for the elderly, the contrast and brightness of the smart terminal is increased by 24% (20%*120%*100%).

If the parameter adjustment mode is the weakened mode and the user identity information is for adults, the adjustment ratio is 100%. If the user identity information is for children, the adjustment ratio may be 120%. If the user identity information is for the elderly, the adjustment ratio may be 80%, for example, the parameter such as the contrast and brightness is reduced according to the seventh ratio (20%). If the user identity information is for adults, then the contrast and brightness of the smart terminal is reduced by 20% (20%*100%). If the user identity information is for children, the contrast and brightness of the smart terminal is reduced by 24% (20%*120%*100%). If the user identity information is for the elderly, the contrast and brightness of the smart terminal is reduced by 16% (20%*80%*100%).

Since the hearing and vision of the elderly are weaker than that of adults, and the hearing and vision of children are stronger than that of adults, the above adjustments may ensure that the adjusted video playback parameters for the elderly are larger than the adjusted video playback parameters of adults, and the adjusted video playback parameters for adults are larger than the adjusted video playback parameters of children.

According to the method for adjusting the video parameter based on voiceprint recognition in this embodiment, during a video program is displayed on a smart terminal, receiving audio information collected by a voiceprint data collection module; in a determination that a voiceprint feature library includes target preset audio information corresponding to the audio information, determining user identity information and user mood information corresponding to the audio information based on the target preset audio information; acquiring an adjustment parameter of a parameter adjustment mode corresponding to the user mood information, and acquiring an adjustment ratio corresponding to the parameter adjustment mode based on the user identity information; and adjusting a video playback parameter of the smart terminal based on the adjustment parameter and the adjustment ratio. In this way, the video playback parameter of the smart terminal may be automatically adjusted according to the user identity information and the user mood information corresponding to the audio information, so as to realize the intelligent adjustment of the video playback parameter of the smart terminal and improve the user experience.

Based on the first embodiment, a second embodiment of the method for adjusting the video parameter based on voiceprint recognition in this application is provided. In this embodiment, S200 includes:

S210, determining a voiceprint feature vector corresponding to the audio information;

S220, determining whether a preset feature vector corresponding to preset audio information of the voiceprint feature library comprises a target feature vector matching the voiceprint feature vector; and S230, in a determination that the preset feature vector corresponding to the preset audio information of the voiceprint feature library comprises the target feature vector matching the voiceprint feature vector, determining the user identity information and the user mood information corresponding to the audio information based on the target preset audio information corresponding to the target feature vector.

In this embodiment, the smart terminal is provided with a voiceprint feature library. The voiceprint feature library stores preset audio information of various moods corresponding to each member of the family to which the smart terminal belongs, and the voiceprint feature library stores preset feature vectors corresponding to the preset audio information, and user mood information and user identity information corresponding to the preset audio information.

Since the speech signal is a short-term stationary signal and a long-term non-stationary signal, its long-term non-stationary characteristic is caused by the change of the physical movement process of the articulator. However, there is a certain inertia in the movement of the articulator, so in a short time, the speech signal is similar to a stationary signal, and the short time generally ranges from 10 to 30 milliseconds. Therefore, the preset time window may be set as a time window of 15 to 20 milliseconds.

When receiving audio information, the smart terminal determines the voiceprint feature vector corresponding to the audio information. Specifically, the smart terminal samples the audio information at a preset frequency based on the preset time window, and generates voiceprint feature vector based on the sampled data. Specifically, first the voice information is windowed according to the preset time window to obtain voice information in the preset time window, and the voice information in the preset time window is sampled according to the preset frequency (for example, 8 KHz) to obtain multiple sampling point data, and a voiceprint feature vector is generated based on the sampling point data, that is, each sampling point data is used as an element of a vector to obtain the voiceprint feature vector.

When determining the voiceprint feature vector, it is determined whether a preset feature vector corresponding to preset audio information of the voiceprint feature library includes a target feature vector matching the voiceprint feature vector. Specifically, a first similarity between the voiceprint feature vector and each preset feature vector is calculated, where the similarity is a cosine value between the voiceprint feature vector and each preset feature vector, and the target feature vector is determined based on the first similarity.

If the preset feature vector corresponding to the preset audio information of the voiceprint feature library includes the target feature vector matching the voiceprint feature vector, based on target preset audio information corresponding to the target feature vector, the user identity information and the user mood information corresponding to the audio information are determined. Specifically, user identity information and user mood information corresponding to the target preset audio information are taken as the user identity information and the user mood information corresponding to the audio information.

According to the method for adjusting the video parameter based on voiceprint recognition provided in this embodiment, determining a voiceprint feature vector corresponding to the audio information; determining whether a preset feature vector corresponding to preset audio information of the voiceprint feature library includes a target feature vector matching the voiceprint feature vector; and in a determination that the preset feature vector corresponding to the preset audio information of the voiceprint feature library includes the target feature vector matching the voiceprint feature vector, determining the user identity information and the user mood information corresponding to the audio information based on the target preset audio information corresponding to the target feature vector. So that the user identity information and the user mood information are accurately acquired according to the target feature vector, thereby improving the accuracy of adjusting the video playback parameters of the smart terminal based on the audio information, and further improving the user experience.

Based on the second embodiment, a third embodiment of the method for adjusting the video parameter based on voiceprint recognition in this application is provided. In this embodiment, S220 includes:

S221, calculating a first similarity between the preset feature vector corresponding to each preset audio information in the voiceprint feature library and the voiceprint feature vector; and S222, determining whether a maximum similarity in the first similarity is greater than a first preset similarity, wherein, in a determination that the maximum similarity in the first similarity is greater than the first preset similarity, determining the voiceprint feature library comprises the target feature vector matching the voiceprint feature vector, wherein a preset voiceprint feature vector corresponding to the maximum similarity in the first similarity is the target feature vector.

In this embodiment, when the voiceprint feature vector corresponding to the audio information is acquired, the first similarity between the preset feature vector and the voiceprint feature vector is calculated, that is, the similarity between each preset feature vector and the voiceprint feature vector is calculated in turn to obtain the first similarity, where the first similarity is a cosine value between the voiceprint feature vector and each preset feature vector.

When the first similarity is obtained, compare each similarity in the first similarity to obtain the maximum similarity in the first similarity, and determine whether the maximum similarity in the first similarity is greater than the first preset similarity. Where, in a determination that the maximum similarity in the first similarity is greater than the first preset similarity, determining the voiceprint feature library includes the target feature vector matching the voiceprint feature vector, where a preset voiceprint feature vector corresponding to the maximum similarity in the first similarity is the target feature vector.

Where, the first preset similarity may be set reasonably, for example, the first preset similarity is 80%.

In this embodiment, if the maximum similarity in the first similarity is less than or equal to the first preset similarity, it is determined that there is no target feature vector matching the voiceprint feature vector in the voiceprint feature library, and then it is determined that there is no target preset audio information corresponding to the audio information in the voiceprint feature library.

According to the method for adjusting the video parameter based on voiceprint recognition provided in this embodiment, calculating a first similarity between the preset feature vector corresponding to each preset audio information in the voiceprint feature library and the voiceprint feature vector, determining whether a maximum similarity in the first similarity is greater than a first preset similarity, where, in a determination that the maximum similarity in the first similarity is greater than the first preset similarity, determining the voiceprint feature library includes the target feature vector matching the voiceprint feature vector, where a preset voiceprint feature vector corresponding to the maximum similarity in the first similarity is the target feature vector. So that the user identity information and the user mood information may be accurately acquired according to the first similarity, thereby improving the accuracy of adjusting the video playback parameters of the smart terminal based on the audio information, and further improving the user experience.

Based on the second embodiment, a fourth embodiment of the method for adjusting the video parameter based on voiceprint recognition in this application is provided. In this embodiment, S210 includes:

S211, based on a preset time window, sampling the audio information at a preset frequency to acquire sample data; and S212, generating the voiceprint feature vector according to the sample data.

Since the speech signal is a short-term stationary signal and a long-term non-stationary signal, its long-term non-stationary characteristic is caused by the change of the physical movement process of the articulator. However, there is a certain inertia in the movement of the articulator, so in a short time, the speech signal is similar to a stationary signal, and the short time generally ranges from 10 to 30 milliseconds. Therefore, the preset time window may be set as a time window of 15 to 20 milliseconds.

In this embodiment, when the audio information is received, the smart terminal samples the audio information at a preset frequency based on the preset time window, and generates voiceprint feature vector based on the sampled data. Specifically, first the voice information is windowed according to the preset time window to obtain voice information in the preset time window, and the voice information in the preset time window is sampled according to the preset frequency (for example, 8 KHz) to obtain multiple sampling point data, and a voiceprint feature vector is generated based on the sampling point data, that is, each sampling point data is used as an element of a vector to obtain the voiceprint feature vector.

According to the method for adjusting the video parameter based on voiceprint recognition provided in this embodiment, based on a preset time window, sampling the audio information at a preset frequency to acquire sample data; and generating the voiceprint feature vector according to the sample data. So that the voiceprint feature vector may be accurately obtained according to the preset time window and the preset frequency, thereby improving the accuracy of adjusting the video playback parameters of the smart terminal based on the audio information, and further improving the user experience.

Based on the second embodiment, a fifth embodiment of the method for adjusting the video parameter based on voiceprint recognition in this application is provided. In this embodiment, the voiceprint feature vector includes a pitch feature vector, a loudness feature vector, and a timbre feature vector, and S220 includes:

S223, calculating a second similarity between a preset timbre feature vector in each preset feature vector and the timbre feature vector;

S224, in a determination that a maximum similarity in the second similarity is greater than a second preset similarity, determining user identity information corresponding to the preset timbre feature vector of the maximum similarity in the second similarity, acquiring a preset pitch feature vector and a preset loudness feature vector corresponding to the parameter adjustment mode based on the user identity information, wherein the parameter adjustment mode comprises an enhanced mode, an intermediate mode, and a weakened mode;

S225, calculating a third similarity between the pitch feature vector and the preset pitch feature vector, and calculating a fourth similarity between the loudness feature vector and the preset loudness feature vector; and S226, based on the third similarity and the fourth similarity, determining whether the preset feature vector comprises the target feature vector matching the voiceprint feature vector.

In this embodiment, the preset feature vector of the voiceprint feature library includes a preset pitch feature vector, a preset loudness feature vector, and a preset timbre feature vector. When multiple sampling point data is obtained corresponding to the audio information, the pitch feature vector, the loudness feature vector, and the timbre feature vector are generated based on the sampling point data, or the voice information in the preset time window is processed to obtain pitch information, loudness information, and timbre information, and they are sampled separately to obtain the pitch feature vector, the loudness feature vector and the timbre feature vector.

Because timbre is the attribute that may best reflect a person's identity information, compared with when a person is calm, when the person feels low, the loudness and pitch of the voice message will be significantly reduced, and when the person feels happy, the loudness and pitch of the voice message will increase significantly, while the timbre of voice messages will not change significantly in different moods.

Therefore, in this embodiment, the second similarity between the preset timbre feature vector in each preset feature vector and the timbre feature vector is calculated, and the second similarity is calculated in a manner similar to the first similarity, that is, the second similarity is a cosine value between the timbre feature vector and each preset timbre feature vector. Then each similarity in the second similarity is compared to determine the maximum similarity in the second similarity. In a determination that a maximum similarity in the second similarity is greater than a second preset similarity, determining user identity information corresponding to the preset timbre feature vector of the maximum similarity in the second similarity, acquiring a preset pitch feature vector and a preset loudness feature vector corresponding to the parameter adjustment mode based on the user identity information, where the parameter adjustment mode includes an enhanced mode, an intermediate mode, and a weakened mode, and the parameter adjustment mode corresponds to different user mood information respectively.

Then, calculating a third similarity between the pitch feature vector and the preset pitch feature vector, and calculating a fourth similarity between the loudness feature vector and the preset loudness feature vector, where the third similarity is a cosine value between the pitch feature vector and each preset pitch feature vector, and the fourth similarity is a cosine value between the loudness feature vector and each preset loudness feature vector. Then, based on the third similarity and the fourth similarity, determining whether the preset feature vector includes the target feature vector matching the voiceprint feature vector.

Further, in an embodiment, if the maximum similarity in the second similarity is less than or equal to the second preset similarity, it is determined that there is no target feature vector matching the voiceprint feature vector in the voiceprint feature library, and then it is determined that there is no target preset audio information corresponding to the audio information in the voiceprint feature library. According to the method for adjusting the video parameter based on voiceprint recognition provided in this embodiment, calculating a second similarity between a preset timbre feature vector in each preset feature vector and the timbre feature vector; in a determination that a maximum similarity in the second similarity is greater than a second preset similarity, determining user identity information corresponding to the preset timbre feature vector of the maximum similarity in the second similarity, acquiring a preset pitch feature vector and a preset loudness feature vector corresponding to the parameter adjustment mode based on the user identity information, where the parameter adjustment mode includes an enhanced mode, an intermediate mode, and a weakened mode; then calculating a third similarity between the pitch feature vector and the preset pitch feature vector, and calculating a fourth similarity between the loudness feature vector and the preset loudness feature vector; and based on the third similarity and the fourth similarity, determining whether the preset feature vector includes the target feature vector matching the voiceprint feature vector. So that the target feature vector may be accurately determined according to the timbre feature vector, the pitch feature vector, and the loudness feature vector, which further improves the accuracy of the adjustment of the video playback parameters of the smart terminal based on the audio information and further improves the user experience.

Based on the fifth embodiment, a sixth embodiment of the method for adjusting the video parameter based on voiceprint recognition in this application is provided. In this embodiment, S226 includes:

S2261, calculating a fifth similarity corresponding to each parameter adjustment mode based on the third similarity and the fourth similarity; and S2262, determining whether a maximum similarity in the fifth similarity is greater than a third preset similarity, wherein, in a determination that the maximum similarity in the fifth similarity is greater than the third preset similarity, determining the preset feature vector comprises the target feature vector matching the voiceprint feature vector, wherein a preset feature vector corresponding to the maximum similarity in the fifth similarity is the target feature vector.

In this embodiment, when the third similarity and the fourth similarity are acquired, the fifth similarity corresponding to each parameter adjustment mode is calculated. Specifically, the fifth similarity is calculated according to a first weight corresponding to the third similarity and a second weight corresponding to the fourth similarity. For example, for each parameter adjustment mode, the fifth similarity=the third similarity*the first weight+the fourth similarity*the second weight, where a sum of the first weight and the second weight is 1, and the first weight may be 0.5, 0.6, 0.8, and so on.

In response to obtaining the fifth similarity, determining a maximum similarity in the fifth similarity, and determining whether a maximum similarity in the fifth similarity is greater than a third preset similarity, where, in a determination that the maximum similarity in the fifth similarity is greater than the third preset similarity, determining the preset feature vector includes the target feature vector matching the voiceprint feature vector, where a preset feature vector corresponding to the maximum similarity in the fifth similarity is the target feature vector.

Further, in an embodiment, if the maximum similarity in the fifth similarity is less than or equal to the third preset similarity, it is determined that there is no target feature vector matching the voiceprint feature vector in the voiceprint feature library, and then it is determined that there is no target preset audio information corresponding to the audio information in the voiceprint feature library.

According to the method for adjusting the video parameter based on voiceprint recognition provided in this embodiment, calculating a fifth similarity corresponding to each parameter adjustment mode based on the third similarity and the fourth similarity; and determining whether a maximum similarity in the fifth similarity is greater than a third preset similarity, where, in a determination that the maximum similarity in the fifth similarity is greater than the third preset similarity, determining the preset feature vector includes the target feature vector matching the voiceprint feature vector, where a preset feature vector corresponding to the maximum similarity in the fifth similarity is the target feature vector. So that the target feature vector may be accurately determined according to the fifth similarity, which further improves the accuracy of adjusting the video playback parameters of the smart terminal based on the audio information, and further improves the user experience.

Based on the first embodiment, a seventh embodiment of the method for adjusting the video parameter based on voiceprint recognition in this application is provided. In this embodiment, S200 includes:

S240, sending the audio information to a cloud server for the cloud server determining voiceprint feature information corresponding to the audio information, finding and feeding back user identity information and user mood information corresponding to a target preset voiceprint feature matching the voiceprint feature information; and S250, receiving the user identity information and the user mood information fed back by the cloud server.

In this embodiment, the audio information may also be sent to the cloud server, so that the cloud server feeds back user identity information and user mood information according to the audio information, where the process of the cloud server obtaining the user identity information and the user mood information according to the audio information is similar to the process in the foregoing embodiment, which will not be repeated here.

According to the method for adjusting the video parameter based on voiceprint recognition provided in this embodiment, sending the audio information to a cloud server for the cloud server determining voiceprint feature information corresponding to the audio information, finding and feeding back user identity information and user mood information corresponding to a target preset voiceprint feature matching the voiceprint feature information; and then receiving the user identity information and the user mood information fed back by the cloud server. So that the user identity information and the user mood information may be accurately acquired through the cloud server, which improves the accuracy of adjusting the video playback parameters of the smart terminal based on the audio information and further improves the user experience.

Based on the above embodiments, an eighth embodiment of the method for adjusting the video parameter based on voiceprint recognition in this application is provided. In this embodiment, after S100, the method for adjusting the video parameter based on voiceprint recognition further includes:

S500, in a determination that the voiceprint feature library does not comprise the target preset audio information corresponding to the audio information, performing voice recognition on the audio information to acquire the user identity information and the user mood information corresponding to the audio information; and S600, taking the audio information as preset audio information, and storing the audio information in the voiceprint feature library in association with the user identity information and the user mood information.

In this embodiment, the voiceprint feature vector may also be obtained according to the audio information, or the pitch feature vector, the loudness feature vector, and the timbre feature vector may be obtained, and stored in association with the audio information. The process of acquiring the voiceprint feature vector is similar to the above embodiments, which will not be repeated here.

After acquiring the user identity information and the user mood information, the smart terminal may further output the user identity information and the user mood information for the user to confirm, and when receiving the user's confirmation instruction, the smart terminal may use the audio information as the preset audio information and stored in the voiceprint feature library in association with the user identity information and the user mood information.

It should be noted that after the associated storage, setting information of other mood information of the user may also be output, so that the user may speak according to the other mood information, and S500 is executed according to the currently obtained audio information.

According to the method for adjusting the video parameter based on voiceprint recognition provided in this embodiment, in a determination that a voiceprint feature library does not include target preset audio information corresponding to the audio information, performing voice recognition on the audio information to acquire the user identity information and the user mood information corresponding to the audio information; and taking the audio information as preset audio information, and storing the audio information in the voiceprint feature library in association with the user identity information and the user mood information. So that the preset audio information may be updated in the voiceprint feature library according to the audio information, thereby further improving the voiceprint feature library and further improving the user experience.

In addition, some embodiments of this application further provide a readable storage medium, a computer readable instruction is stored on the readable storage medium, the computer readable instruction, when executed by the processor, implements the operations of any of the aforementioned methods for adjusting the video parameter based on voiceprint recognition.

The specific embodiments of the readable storage medium of this application are basically the same as the foregoing embodiments of the method for adjusting the video parameter based on voiceprint recognition, which will not be described in detail here.

It should be noted that in this article, the terms "comprise", "include" or any other variant thereof are intended to cover non-exclusive inclusion, so that a process, method, article or system that includes a series of elements includes not only those elements, but also other elements that are not explicitly listed, or include elements inherent to this process, method, article, or system. Without more restrictions, the element defined by the sentence "comprise a . . . " does not exclude that there are other identical elements in the process, method, article or system that includes the element.

The sequence numbers of the above embodiments of this application are for description only, and do not represent the advantages and disadvantages of the embodiments.

Through the description of the above embodiments, those skilled in the art can clearly understand that the methods in the above embodiments can be implemented by means of software plus a necessary general hardware platform, and of course, can also be implemented by hardware, but in many cases the former is better. Based on this understanding, the technical solution of this application can be embodied in the form of a software product in essence or part that contributes to the existing technology, and the computer software product is stored in a storage medium (such as ROM/RAM, Magnetic disk, optical disk as described above), including several instructions to make a terminal device (which can be a mobile phone, computer, server, air conditioner, or network equipment, etc.) to implement the method described in each embodiment of this application.

The above are only preferred embodiments of this application and do not limit the patent scope of this application. Any equivalent structure or equivalent process transformation made by the description and drawings of this application, or directly or indirectly used in other related technical fields are similarly included in the patent protection scope of this application.

What is claimed is:

1. A method for adjusting a video parameter based on voiceprint recognition, comprising the following operations:

during a video program is played on a smart terminal, receiving audio information collected by a voiceprint data collection module;

in a determination that a voiceprint feature library comprises target preset audio information corresponding to the audio information, determining user identity information and user mood information corresponding to the audio information based on the target preset audio information;

acquiring an adjustment parameter of a parameter adjustment mode corresponding to the user mood information, and acquiring an adjustment ratio corresponding to the parameter adjustment mode based on the user identity information; and adjusting a video playback parameter of the smart terminal based on the adjustment parameter and the adjustment ratio;

wherein in a determination that a voiceprint feature library comprises target preset audio information corresponding to the audio information, determining user identity information and user mood information corresponding to the audio information based on the target preset audio information comprises:

determining a voiceprint feature vector corresponding to the audio information;

determining whether a preset feature vector corresponding to preset audio information of the voiceprint feature library comprises a target feature vector matching the voiceprint feature vector; and in a determination that the preset feature vector corresponding to the preset audio information of the voiceprint feature library comprises the target feature vector matching the voiceprint feature vector, determining the user identity information and the user mood information corresponding to the audio information based on the target preset audio information corresponding to the target feature vector;

wherein determining a voiceprint feature vector corresponding to the audio information comprises:
based on a preset time window, sampling the audio information at a preset frequency to acquire sample data; and
generating the voiceprint feature vector according to the sample data.

2. The method for adjusting the video parameter based on voiceprint recognition of claim 1, wherein determining whether a preset feature vector corresponding to preset audio information of the voiceprint feature library comprises a target feature vector matching the voiceprint feature vector comprises:
calculating a first similarity between the preset feature vector corresponding to each preset audio information in the voiceprint feature library and the voiceprint feature vector; and
determining whether a maximum similarity in the first similarity is greater than a first preset similarity, wherein, in a determination that the maximum similarity in the first similarity is greater than the first preset similarity, determining the voiceprint feature library comprises the target feature vector matching the voiceprint feature vector, wherein a preset voiceprint feature vector corresponding to the maximum similarity in the first similarity is the target feature vector.

3. The method for adjusting the video parameter based on voiceprint recognition of claim 2, wherein after receiving audio information collected by a voiceprint data collection module, the method for adjusting the video parameter based on voiceprint recognition further comprises:
in a determination that the voiceprint feature library does not comprise the target preset audio information corresponding to the audio information, performing voice recognition on the audio information to acquire the user identity information and the user mood information corresponding to the audio information; and
taking the audio information as the preset audio information, and storing the audio information in the voiceprint feature library in association with the user identity information and the user mood information.

4. The method for adjusting the video parameter based on voiceprint recognition of claim 1, wherein the voiceprint feature vector comprises a pitch feature vector, a loudness feature vector, and a timbre feature vector, and determining whether a preset feature vector corresponding to preset audio information of the voiceprint feature library comprises a target feature vector matching the voiceprint feature vector comprises:
calculating a second similarity between a preset timbre feature vector in each preset feature vector and the timbre feature vector;
in a determination that a maximum similarity in the second similarity is greater than a second preset similarity, determining user identity information corresponding to the preset timbre feature vector of the maximum similarity in the second similarity, acquiring a preset pitch feature vector and a preset loudness feature vector corresponding to the parameter adjustment mode based on the user identity information, wherein the parameter adjustment mode comprises an enhanced mode, an intermediate mode, and a weakened mode;
calculating a third similarity between the pitch feature vector and the preset pitch feature vector, and calculating a fourth similarity between the loudness feature vector and the preset loudness feature vector; and
based on the third similarity and the fourth similarity, determining whether the preset feature vector comprises the target feature vector matching the voiceprint feature vector.

5. The method for adjusting the video parameter based on voiceprint recognition of claim 4, wherein based on the third similarity and the fourth similarity, determining whether the preset feature vector comprises the target feature vector matching the voiceprint feature vector comprises:
calculating a fifth similarity corresponding to each parameter adjustment mode based on the third similarity and the fourth similarity; and
determining whether a maximum similarity in the fifth similarity is greater than a third preset similarity, wherein, in a determination that the maximum similarity in the fifth similarity is greater than the third preset similarity, determining the preset feature vector comprises the target feature vector matching the voiceprint feature vector, wherein a preset feature vector corresponding to the maximum similarity in the fifth similarity is the target feature vector.

6. The method for adjusting the video parameter based on voiceprint recognition of claim 5, wherein after receiving audio information collected by a voiceprint data collection module, the method for adjusting the video parameter based on voiceprint recognition further comprises:
in a determination that the voiceprint feature library does not comprise the target preset audio information corresponding to the audio information, performing voice recognition on the audio information to acquire the user identity information and the user mood information corresponding to the audio information; and
taking the audio information as the preset audio information, and storing the audio information in the voiceprint feature library in association with the user identity information and the user mood information.

7. The method for adjusting the video parameter based on voiceprint recognition of claim 4, wherein after receiving audio information collected by a voiceprint data collection module, the method for adjusting the video parameter based on voiceprint recognition further comprises:
in a determination that the voiceprint feature library does not comprise the target preset audio information corresponding to the audio information, performing voice recognition on the audio information to acquire the user identity information and the user mood information corresponding to the audio information; and
taking the audio information as the preset audio information, and storing the audio information in the voiceprint feature library in association with the user identity information and the user mood information.

8. The method for adjusting the video parameter based on voiceprint recognition of claim 1, wherein in a determination that a voiceprint feature library comprises target preset audio information corresponding to the audio information, determining user identity information and user mood information corresponding to the audio information based on the target preset audio information comprises:
sending the audio information to a cloud server for the cloud server determining voiceprint feature information corresponding to the audio information, finding and feeding back user identity information and user mood information corresponding to a target preset voiceprint feature matching the voiceprint feature information; and
receiving the user identity information and the user mood information fed back by the cloud server.

9. The method for adjusting the video parameter based on voiceprint recognition of claim 1, wherein after receiving audio information collected by a voiceprint data collection module, the method for adjusting the video parameter based on voiceprint recognition further comprises:

in a determination that the voiceprint feature library does not comprise target preset audio information corresponding to the audio information, performing voice recognition on the audio information to acquire the user identity information and the user mood information corresponding to the audio information; and taking the audio information as preset audio information, and storing the audio information in the voiceprint feature library in association with the user identity information and the user mood information.

10. A device for adjusting a video parameter based on voiceprint recognition, comprising: a memory, a processor, and a computer readable instruction stored on the memory and executable on the processor, the computer readable instruction, when executed by the processor, implements the operations of the method for adjusting the video parameter based on voiceprint recognition of claim 1.

11. A non-transitory readable storage medium, wherein a computer readable instruction is stored on the readable storage medium, the computer readable instruction, when executed by the processor, implements the operations of the method for adjusting the video parameter based on voiceprint recognition of claim 1.

\* \* \* \* \*